United States Patent [19]

Büchler

[11] Patent Number: 5,036,579
[45] Date of Patent: Aug. 6, 1991

[54] METHOD FOR MAKING A FIRST OBJECT WHICH CAN BE FIXED WITH GREAT ACCURACY WITH RESPECT TO A SECOND OBJECT

[75] Inventor: René Büchler, Oberbüren, Switzerland

[73] Assignee: Büchler B-Set AG, Flawil, Switzerland

[21] Appl. No.: 529,851

[22] Filed: May 29, 1990

Related U.S. Application Data

[62] Division of Ser. No. 245,002, Sep. 15, 1988, abandoned.

[51] Int. Cl.[5] .................................................. B23P 17/00
[52] U.S. Cl. ...................................... 29/527.3; 29/434; 29/898.043; 29/898.12; 29/526.3; 269/309; 384/244; 384/246
[58] Field of Search .................. 29/527.3, 527.5, 441.1, 29/434, 898.093, 898.092, 898.07, 898.09, 898.12, 434, 526.3; 384/244, 245, 246, 625; 269/309

[56] References Cited

U.S. PATENT DOCUMENTS

| | | | |
|---|---|---|---|
| 1,493,212 | 5/1924 | Link | 29/527.5 X |
| 2,352,346 | 6/1944 | Schiffl | 29/898.12 X |
| 4,116,500 | 9/1978 | Hüber | 29/898.043 X |
| 4,225,261 | 9/1980 | Marx | 29/434 X |
| 4,371,075 | 2/1983 | Erlichman | |
| 4,757,890 | 7/1988 | Motoda | |
| 4,838,533 | 6/1989 | Büchler | |

FOREIGN PATENT DOCUMENTS

| | | |
|---|---|---|
| 111092 | 10/1983 | European Pat. Off. |
| 87-16192 | 7/1987 | Fed. Rep. of Germany |
| 267879 | 7/1927 | United Kingdom ............ 29/898.12 |

Primary Examiner—Carl J. Arbes
Attorney, Agent, or Firm—Helfgott & Karas

[57] ABSTRACT

A method for making a first object (1) which can be fixed with great precision with respect to a second object (2) comprises the steps of pressure-casting the first object from a plastically deformable, relatively soft metal such as light metals and zinc alloys, sizing the first object (1) at least in the area of desired surfaces (12, 13, 14) of contact between the first object (1) and the second object (2) by pressing the first object (1) into a sizing tool which consists of a hard material and has in the area of the contact surfaces (12 to 14) a negative form with respect to the desired form of the first object (1), the first object (1) undergoing a plastic deformation at least in the area of the contact surfaces (12 to 14). The additional step is performed of applying a relatively hard metal surface coating to the first object (1) at least in the area of the contact surfaces (12 to 14) (FIG. 1).

8 Claims, 10 Drawing Sheets

METHOD FOR MAKING A FIRST OBJECT WHICH CAN BE FIXED WITH GREAT ACCURACY WITH RESPECT TO A SECOND OBJECT

This is a division of application Ser. No. 245,002, filed Sept. 15, 1988, now abandoned.

BACKGROUND OF THE INVENTION

The present invention relates to a method for making a first object which can be fixed with great accuracy in regard to its position in contact with a second object, and to an apparatus having a first object which can be fixed with great accuracy with regard to its position in contact with a second object.

In particular the present invention relates to a receiving device or pallet on which a workpiece can be clamped, and which can be fixed with great accuracy in its geometrical position in contact with a machine table of a machine tool.

The applicant's German Federal Gebrauchsmuster 87 01 619.2 there is already disclosed an apparatus for the repeatable, very precise fixing of the geometrical position of a first object with respect to a second object, in which the first device is especially in the form of a pallet bearing a workpiece and the second object in the form of a support or table of a machine tool. The pallet has a number of centering tenons disposed in one plane and spaced apart from one another at uniform angles in the plane, which upon the placement of the pallet against the support or machine table produce, with matching recesses int he support or table, a highly precise fixation of these parts with respect to one another. Both the pallet and the support or table are made from a high-quality machine steel. Since even in high precision machining of the pallet as well as the machine table slight departures of the centering tenons from the position of the recesses in the machine table are inevitable, provision is made in the known apparatus that the recesses in the support or table have lateral guiding walls provided with grooves, which when the centering tenons are introduced into the grooves, separate in resilient contact with the centering tenons. The necessity of the guiding walls yielding resiliently in the micron range to compensate for deviations between an ideal position of the centering tenons of the pallet and the position actually reached in production requires, on the one hand, a relatively complex machine table. On the other hand, the production of the pallets, of which a relatively great number are needed for each machine, is relatively expensive on account of the need for complex machining of the machine steel. Another problem in the operation of the known apparatus arises out of the relatively great weight of pallets made from machine steel.

European patent 0 111 092 (Erowa) has already disclosed a machine table for machine tools having a receiver for pallets; the pallets have at least two centering tenons which, when the pallets are placed on the machine table, engage in recesses in a spring steel disk fastened to the machine table and separated from the latter vertically. The recesses are configured so that, when the centering tenons of the pallet are inserted into the recesses in the spring steel disk a vertical deflection of the marginal areas of the spring steel disk takes place after the centering tenons are inserted, so that the marginal areas of the spring steel disk are deflected horizontally backward simultaneously with the vertical deflection. Therefore the spring steel disk can compensate inaccuracies of the pallet in the positioning of its centering tenons in relation to one another as well as produce a centering of the position of the pallet in relation to the machine table. No information as to how any centering of the pallet with respect to the machine table can be achieved without this relatively complex spring steel disk can be found in this European patent.

The principle of centering a pallet on a machine table by means of a resilient element which engages centering tenons is long known in itself; as shown, for example, by German Patent 12, 57 496 which discloses as one embodiment of the resilient element a flexible wire clamped between flanges and bending horizontally and vertically, for engaging centering tenons. In this disclosure too it is obviously considered necessary to use separate spring elements for compensating inaccuracies between a fixed half coupling and a superimposable half coupling.

SUMMARY OF THE INVENTION

In relation to this state of the art the present invention is addressed to the problem of further improving a method for making a first object which can be fixed with great accuracy with respect to a second object, such that, in spite of making the production of the first object easier, a high accuracy of positioning of the first object in relation to the second object will be assured.

The invention furthermore sets for itself the task of improving a method of claim 9 such that a high accuracy can be achieved in the placement of a workpiece on the surface of the pallet, while the production of the pallet will nevertheless be simple.

Furthermore, the invention sets for itself the task of improving an apparatus such that, although the production of the first object is simplified, its highly accurate positioning in relation to the second object is assured.

In accordance with the method of the present invention, the first object is at first cast from a plastically deformable, relatively soft metal, which is performed by the pressure casting in the case of light metals and zinc alloys. In this process an accuracy of the order of several hundredths of a millimeter is all that can be achieved, even if great accuracy is observed in the casting. Then the first object is pressed into a sizing tool which deforms the object plastically, at least in the area the contact of the desired surfaces with the second object. In this plastic deformation an accuracy is achieved in the contact surfaces in the micron range, plus a densification of the soft metal casting material in the area of the contact surfaces.

The first object is preferably further consolidated, at least the area of the precision-sized contact surface, by a surface treatment, which in is performed by coating the surface with a hard metallic material. Preferably the surface coating consists of nickel. By this coating the desired surface hardness, wear-resistance and attrition resistance is achieved. It is possible, however, to make do without such surface treatment, since the surface of the first object is consolidated by plastic material deformation in the area of the contact surfaces by the sizing step of the process. The surface strength achieved in this manner only has withstood 40,000 loading cycles in practical tests without resulting in any practically significant departures from accuracy.

For the method according to the invention it matters not whether the step of nickel plating the surface is performed before or after the sizing. If the nickel plating is performed after the sizing, an additional resizing may be desirable if extreme accuracy is wanted.

In another advantageous further development of the invention, the first object is further treated by shot polishing. In shot polishing the object to be treated in is placed in a container containing a great number of small pieces, such as metal spheres having the same or even different diameter. Then the container is set in motion for a certain period of time so that the spheres continually strike the surface of the object on account of the movement.

This results in a compression of the material at the surface of the object, and this also a consolidation of the material. In addition, a certain surface texture is produced by a great number of small craters. This surface texture is here very advantageous, since the small craters are able to accommodate very small dirt particles without thereby affecting the accuracy of the mounting.

A process related to shot polishing is the shot peening of the first object whereby the surface undergoes a smoothing of the grain boundaries and a cold working, especially if an aluminum pressure coating is used as material for the first object. This kind of treatment eliminates the undesirable, flaky surface texture of an untreated aluminum pressure casting.

Another advantage of having an aluminum pressure-cast surface that is not nickel plated at the contact surfaces of the first object is that, when the metal is soiled, small particles which get between the two objects in the area of their contact surfaces become pressed into the aluminum material. The positioning accuracy and repeatability are thus not impaired by contamination of the two objects, up to a certain degree.

Aluminum or an aluminum alloy is selected as material for the first object. Aluminum has proven to be especially well suited for the sizing or plastic deformation by pressing into a sizing tool. Furthermore, if the first object is made of aluminum, a desirable reduction of the weight of the first object is achieved, in comparison to the weight that would have to be accepted if it were made of machine steel. If aluminum or aluminum alloy is used, surface treatment by eloxation would provide the desired surface hardness.

The preferred accuracy of the casting of the first object in the area of its contact surfaces is about 10 to 50 microns, preferably about 20 microns, while the accuracy of shape achievable by the sizing operation that follows, based on such casting accuracies, ranges from 1 to 5 microns, preferably about 3 microns. The stated casting accuracies can be achieved with tolerable difficulty in the production of the mold and in the performance of the aluminum pressure casting or other kind of casting. Amazingly, in spite of the relatively great departures of the casting mold from the ideal form, the sizing operation achieves a fidelity of shape in the micron range, while the sizing operation also produces a first consolidation or solidification of the surface. An especially hard surface, which can be easily achieved even in production runs by aluminum pressure coating, is achieved by nickel plating, eloxation or also by mechanical surface treatment such as shot polishing or shot peening.

During the sizing operation, preferably a plastic deformation of the contact surfaces is performed that is so strong that a compression of material and hence a cold working takes place in the area of the contact surfaces.

The principle of the process according to the invention can be applied to the working of the top surface or bearing surface of a pallet, resulting in the production of an extremely even surface for supporting the workpiece, whose position is very precisely defined.

An application of especially great practical importance is achieved when the first object is in the form of a pallet and the second object is the table of a machine tool. The pallet has at least one centering tenon having at least two contact surfaces. An especially appropriate centering the pallet on the table is achieved by disposing the centering tenons in one plane at equal angular intervals from one another, the table having a number of correspondingly arranged grooves in the same number as the centering pins. This arrangement of the centering tenons and grooves leads to an especially simple self-alignment of the pallet with the table when the pallet is placed on the table. Alignment on the Z axis (at right angles to the superimposing movement) is achieved by additional abutments having post-like projections.

The centering tenon can be configured with a recess or can be slotted, so that each centering tenon will have two shoulders which can flex resiliently against one another in its cross-sectional plane. Although the production accuracy achieved in the production method in accordance with the invention by the sizing of the first object is so good that any remaining possible displacements of the centering tenons of the first object from the grooves of the second object can be absorbed merely by the elasticity of the material of the first object, it may be helpful to the centering to provide for spring elasticity in the centering tenons by creating a recess or slot running longitudinally on the tenons, dividing them into spring-elastic shoulders.

An additional, preferred application is the use of the manufacturing method in accordance with the invention in a cylindrical shaft provided with a centering arm. A cylindrical shaft with centering arm is a piece which can be fixed with special accuracy in its axial position and in its angular position with respect to a clamping means for such shafts, known in itself, which has a groove to accommodate the centering arm.

On the basis of the high precision of shape of the first object which can be achieved by the manufacturing method in accordance with the invention in the area of its contact surfaces, the second object can be provided with stiff, non-resilient grooves to accommodate the centering tenon or centering arm. If, for example, the second object is the table of a machine tool, the stiff, non-resilient configuration of the grooves permits considerable simplification of the production of the machine table.

Preferred embodiments of the present invention will be further explained below in reference to the appended drawings.

DETAILED DESCRIPTION OF THE PREFERRED EMBODIMENTS

An economically and technically important application will now be explained in conjunction with FIG. 1, which relates to a pallet 1 which can be made by the method of the invention, and which can be fixed with great accuracy in its position in space with respect to a support 2 or machine table 2 of a machine tool (not shown), in placement against the support or machine table 2. The pallet 1 serves to accommodate a workpiece 3 which is to be worked by the machine tool. The workpiece 3 is precisely aligned with respect to the pallet 1 at a so-called set-up station outside of the machine tool before the pallet is placed on the support or machine table 2. The set-up station has a coupling part, also not shown, for the accommodation of the pallet. At the set-up station the position of the workpiece 3 with respect to this stationary coupling part is very precisely defined. The position of the pallet 1 relative to the workpiece 3 and to the stationary coupling part can be imprecise as long as it is certain that the position of the workpiece 3 with respect to the coupling part itself is aligned with great precision, since a correspondingly precise alignment of the workpiece 3 in relation to the machine table 2 is again assumed when the pallet 1 is placed on the machine table 2. This is assured by the fact that a high-precision machine table 2 is provided at the machine tool, which corresponds in its configuration very precisely to the coupling part of the set-up station, so that ultimately the position of the workpiece 3 with respect to the machine table 2 will correspond to the relative position of the workpiece 3 with respect to the coupling part of the set-up station.

Figure 1:
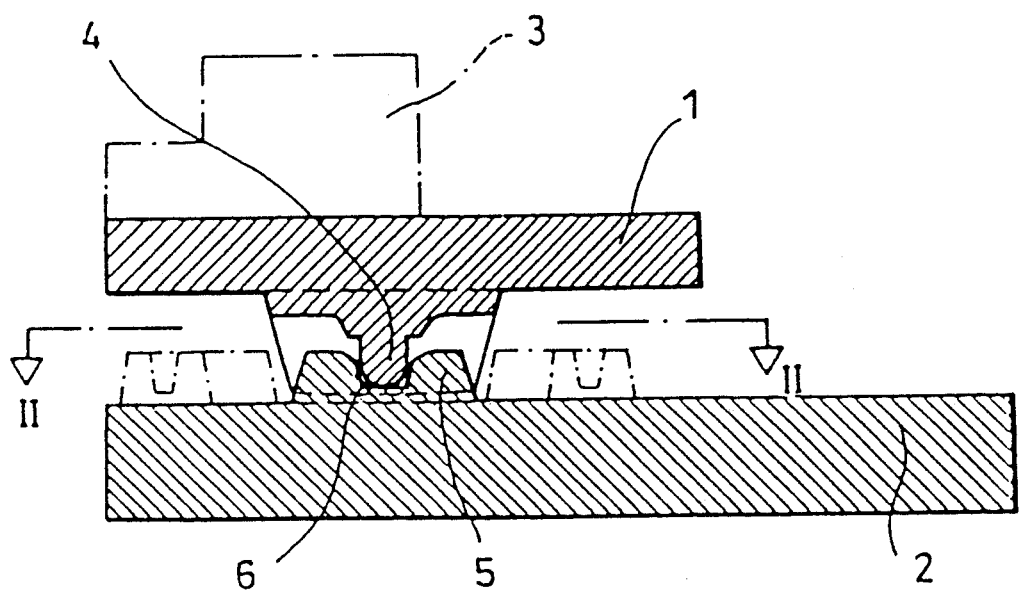
FIG. 1 is a side view of a first embodiment of the apparatus in accordance with the invention.

As it can furthermore be seen in FIG. 1, the pallet 1 has on its bottom a plurality of centering tenons 4 of which one can be seen in a schematic cross-sectional representation in FIG. 1. Each centering tenon 4 engages in a cradle-like post 5 in the machine table 2, which has a groove 6. Both the centering tenon 4 and the cradle-like posts 5 of the machine table are situated in one plane and are offset from one another at equal angular intervals within that plane.

Figure 2:
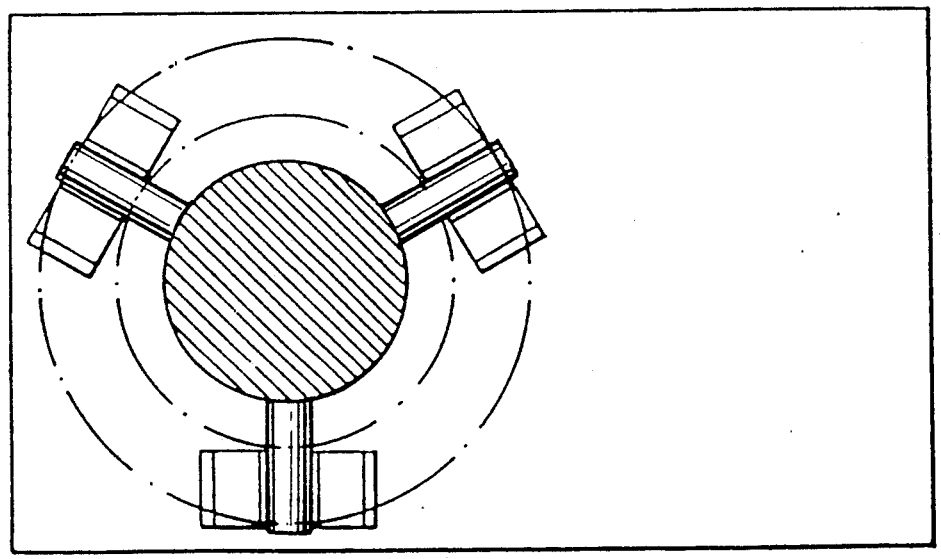
FIG. 2 is a section of the embodiment shown in FIG. 1, taken along line II—II.

As seen particularly in FIG. 2, if there is a chosen number of three centering tenons 4, they will be offset from one another by an angular amount of 120°. Accordingly, the cradle-like posts 5 will be offset by 120° from one another.

Figure 3:
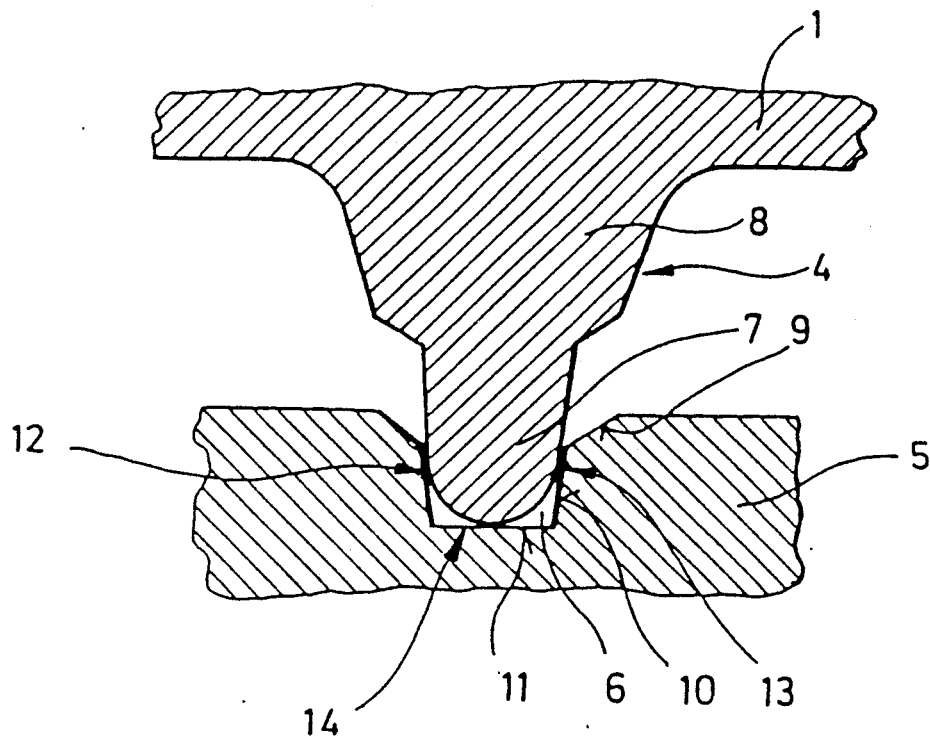
FIG. 3 is a section of a centering tenon and of a groove of an apparatus in accordance with the invention.

As it is shown in detail in FIG. 3, the centering tenon has a rounded head portion 7 which connects through a root 8 to the pallet 1. The groove 6 machined in the cradle-like post 5 widens at its open end to form sloping guiding surfaces which facilitate the introduction of the centering tenon 4 into the groove 6. The groove 6 has two slightly flaring sides 10 and a bottom 11. The angle of the groove 6 is such that no self-locking can occur. The sides 10 and the bottom 11 form with the head 7 of the centering tenon 4 two lateral contact surfaces 12 and 13, as well as a bottom surface 14. The lateral contact surfaces 12 and 13 define the position of the centering tenon 4 in the horizontal direction. The vertical position of the pallet 1, however, is fixed to the socket 5 by cradle-like projections not shown, which are disposed laterally beside the centering tenons 4, and if desired by counter-abutments.

Location of the centering tenons 4 of the pallet 1 with respect to the grooves 6 in the machine table 2 in this manner can result in a highly precise mutual alignment only if the location of the contact surfaces 12, 13, 14, is maintained with an accuracy in the micrometer range, both on the part of the pallet and on the part of the machine table or support 2. The machine table 2 of a machine tool is a precision piece made of high-quality machine steel in which precision of manufacture can be maintained. On the other hand the pallet is made in relatively large numbers and in various configurations, and the precision it requires is achieved by the manufacturing process in accordance with the invention, which is explained below.

A first step in the manufacture of the pallet 1 is the high pressure casting of the pallet 1 from aluminum or an aluminum alloy. It is important that the metal used in casting the pallet 1 is relatively soft and permits plastic deformation. Brittle materials, therefore, cannot be considered for use in the manufacturing process in accordance with the invention.

In the case of high pressure casting of the pallet from aluminum, an accuracy of shape of the order of 10 to 50 microns, and commonly of about 20 microns in the area of the contact surfaces 12 to 14 of the centering tenon 4, which are the only ones relevant to positioning accuracy.

In the next step of the procedure the pallet 1 is sized in the area of the contact surfaces 12 to 14. This sizing is performed by pressing the pallet 1 into a sizing tool, not shown, which consists of a hard material such as tool steel, for example, and has a negative shape with respect to the desired shape of the contact surfaces 12 to 14 of the centering tenons 4 of the pallet 1, at least in the area of the contact surfaces 12 to 14. When the pallet 1 is pressed into the sizing tool the contact surfaces 12 to 14 undergo a plastic deformation and at the same time a compression of material. The plastic deformation of the centering tenon 4 in the area of its contact surfaces 12 to 14 results in a precision in the shape of the contact surfaces ranging between 1 and 5 $\mu$m, commonly of about 3 $\mu$m. The compression at the same time causes the mechanical strength of the contact surfaces to be increased.

In the next step in the procedure a surface coating of a hard metal is applied to the pallet 1 at least in the area of the contact surfaces 12 to 14, this being accomplished by the nickel plating or eloxation at least of the contact surfaces 12 to 14, preferably of the entire surface of the pallet 1.

As it has already been explained, however, the manufacturing step of coating the contact surfaces with a hard material, preferably by nickel plating, can also be carried out prior to the manufacturing step of sizing.

It is likewise possible to omit entirely the surface treatment of applying a surface coating. In this case one contents oneself with the surface compression resulting from the sizing, which provides an appreciable hardening of the surface.

As a result of the manufacturing process described above, the pallet 1 in accordance with the invention, produced by the method of the invention, has a low weight combined with great accuracy of shape in the micron range. It can be produced at low cost by an easily mastered high pressure aluminum casting process, and due to the surface treatment it has an outstanding resistance to wear. In other words, an accuracy of form and resistance to wear never before attained in objects cast from a soft metal are achieved at little expense by the manufacturing method of the invention.

On the basis of the great accuracy of the shape of the contact surfaces achieved in accordance with the present invention, the elasticity of the aluminum pallet is sufficient for the equalization of remaining relative displacements due to manufacturing inaccuracies between the grooves 6 of the machine table 2 and the centering tenons 4 of the pallet 1. For this reason there is no need for the creation of resilient structures in the area of the machine table 2.

The resilient action of the two objects on one another is therefore brought about essentially by the matching of their materials and the particular elasticity modulus of the materials of which the objects are made.

Figure 4:
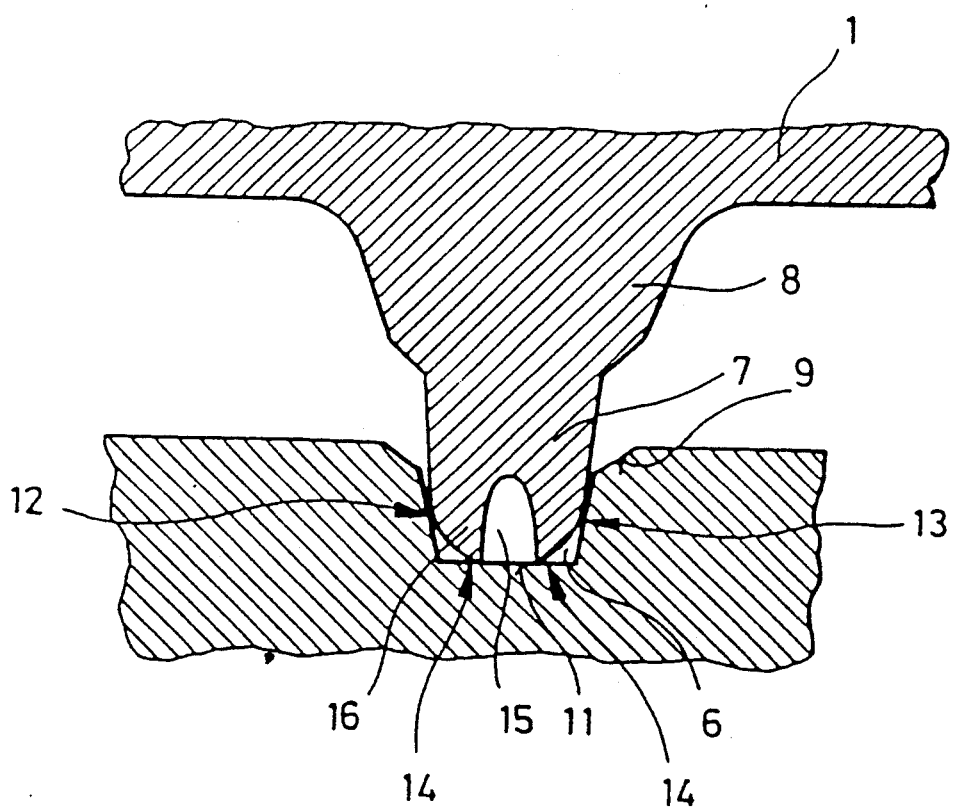
FIG. 4 is a section corresponding to FIG. 3 with a modified configuration of the centering tenon.

Nevertheless to increase the elasticity it is also possible to provide the centering tenons 4 with a recess 15 along their length, or a slot 15 along their length, whereby the centering tenon 4 is divided into two shoulders 16 situated opposite one another, which permit a spring elasticity of the centering tenon 4 in its cross-sectional plane, as it can be seen in FIG. 4. Otherwise, the reference numbers give in FIG. 1 indicate parts identical to those in FIG. 3, so that there is no need to explain them again.

Figure 5:
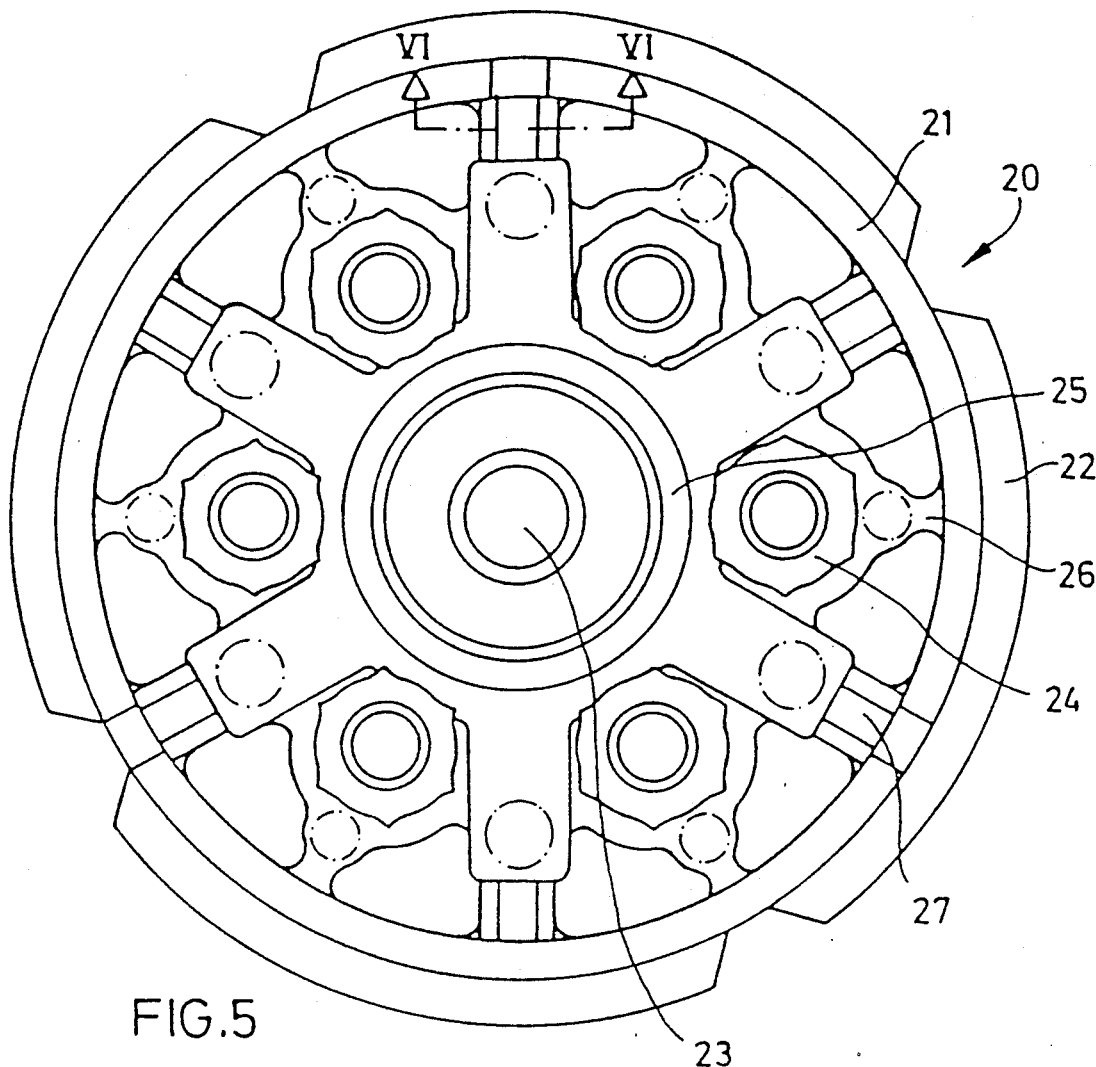
FIG. 5 is a bottom view of a pallet.

FIG. 5 shows a bottom view of a first practically constructed embodiment of a pallet 20 with a skirt-like rim 21 adjoining a sector-shaped circumferential lip 22. The pallet 20 furthermore has a center thread 23. The structure of the pallet 20 explained below is repeated for each 60° angular sector of a total of six angular sectors. Between an inner cylindrical rim 25 and the skirt-like rim 21 there is in each sector a nut socket 24 in which a hexagonal nut can be inserted. The marginal area of the nut socket 24 is supported by a radial arm 26 on the skirt-like rim 21. Between each two nut sockets 24 is a centering tenon 27.

Figure 6:
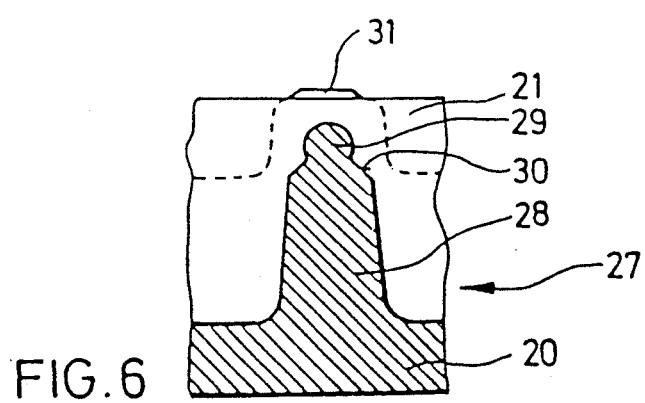
FIG. 6 is a section taken along line VI—VI through the pallet shown in FIG. 5.

FIG. 6 is a cross section taken along the line VI—VI through the centering tenon 27 of the pallet 20 shown in FIG. 5.

The centering tenon 27 runs from the pallet 20 to a base 28 which is connected by a tapered portion 30 to the rounded head 29. The cylindrical rim 25 is provided with a height abutment 31 which defines the vertical position of the pallet 20 in relation to the machine table 2. In this embodiment of the invention, therefore, the centering tenon 27 is important only as a means for the rotary positioning of the pallet 20 with respect to the machine table 2, while the vertical location of the pallet 20 with respect to the machine table 2 is performed by the height abutment 31.

Figure 7:
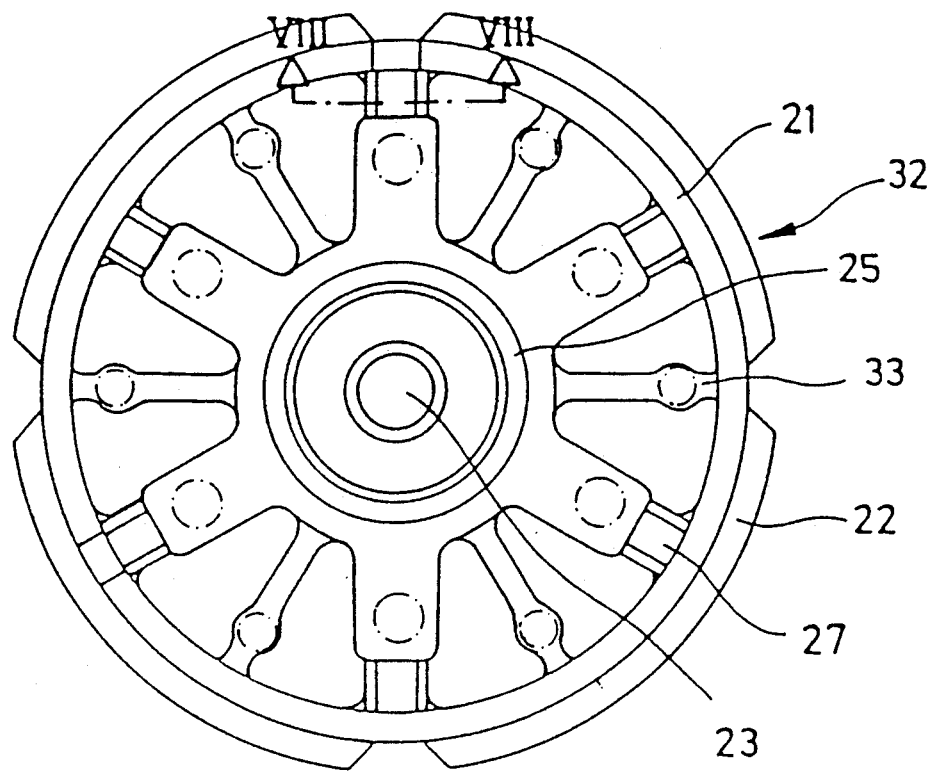
FIG. 7 is a bottom view of an additional pallet.
Figure 8:
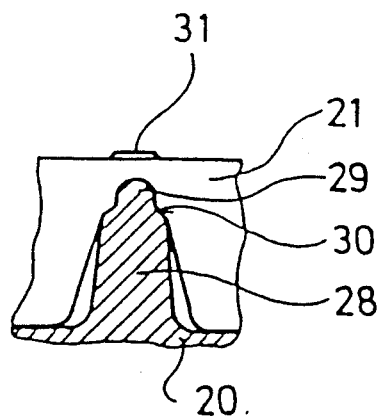
FIG. 8 is a section taken along line VIII—VIII through the pallet shown in FIG. 7.

The second embodiment of the pallet 20 represented in FIG. 7 is largely the same as the first embodiment represented in FIG. 5. Again, the same reference numbers designate the same parts. Thus, the following explanation can be limited to the differences between the pallet 20 of FIG. 5 and the pallet 32 of FIG. 7. In the embodiment of a pallet 32 shown in FIG. 7, no nut sockets 24 are provided, as they were in the embodiment in accordance with FIG. 5. The radial arms 33 accordingly run between the skirt-like rim 21 and the inner rim 25 which surrounds the central thread 23. Otherwise the differences between the second embodiment of the pallet 32 of FIG. 7 and the first embodiment of the pallet 20 of FIG. 5 are only that the second embodiment is smaller both in diameter and in height.

Of course, a pallet may have, instead of the rotationally symmetrical configuration shown in FIGS. 5 and 7, a square, trapezoidal or rectangular plan. However, it is also indicated, if the pallet is made on such a plan, to arrange the centering tenons at uniform angular intervals between them about a center or central point.

Figure 9:
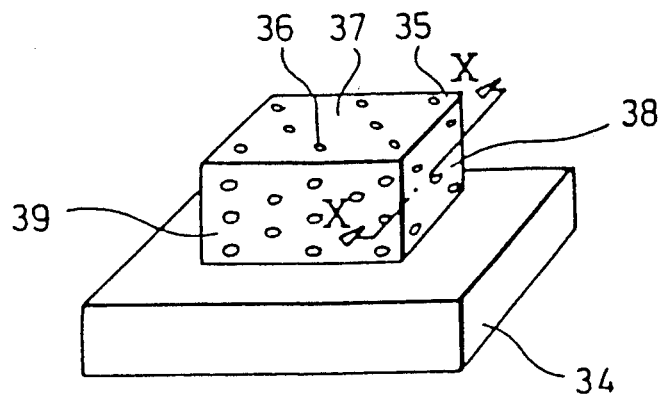
FIG. 9 is a perspective representation of an additional pallet with a superimposed part for clamping workpieces in different positions.

For example, in the third embodiment of a pallet 34 shown in FIG. 9, a rectangular plan has been chosen. The pallet 34 bears an overlay 35 of parallelipipedal shape. The parallelipiped 35 is provided both on its top surface 37 and on its lateral surfaces 38, 39, with a plurality of taps 36, so that a workpiece can be fastened both to the top surface 37 and to the lateral surfaces 38 and 39.

Figure 10:
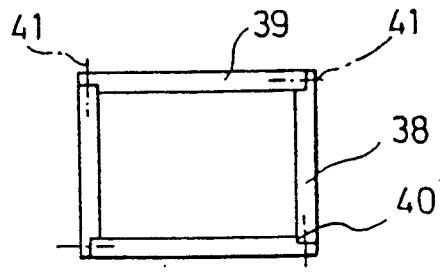
FIG. 10 is a section taken along line X—X through the superimposed part of the pallet shown in FIG. 9.

FIG. 10 is a cross section taken through the parallelipipedal overlay 35 along the line X—X. Each of the lateral surfaces 38 and 39 has in its area in contact with the next lateral surface an indentation 40 extending preferably over about half of the wall thickness of the side surfaces 38, 39. On the broken lines indicated at 41 are screw fasteners by which the lateral surfaces 38 and 39 are screwed against one another. A cementing together of the lateral surfaces can also be practiced.

Figure 11:
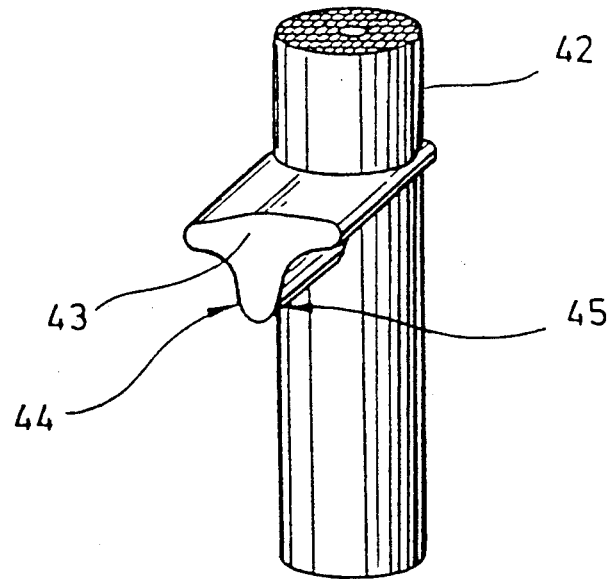
FIG. 11 is an additional, highly accurately fixable element in accordance with the invention, having a cylindrical shaft and a centering arm.

FIG. 11 shows a third embodiment of a first object in accordance with the invention, which can be fixed with great accuracy with respect to a second object. This embodiment consists essentially of a cylindrical shaft 42 with a centering arm 43 merging integrally with the cylindrical shaft and running at right angles to the latter. A shaft 42 constructed in this manner, with centering arm 43, corresponds to a standardized machine clamping device (not shown) within which the shaft 42 produces an axial alignment and the centering arm 43 the alignment of the rotational angle.

The shaft 42 is integrally cast in aluminum together with the centering arm 43 by high-pressure casting. Then the shaft is deep-drawn and the centering arm is sized in the area of the desired contact surfaces 44, 45, by pressing it into a sizing tool, causing a plastic deformation of the centering arm 43 in the area of the contact surfaces 44 and 45, and a compression of the surface in this area also takes place. Then the shaft 42 together with the centering arm 43 is nickel plates or provided with some other appropriate, hard-surfacing treatment.

Figure 12:
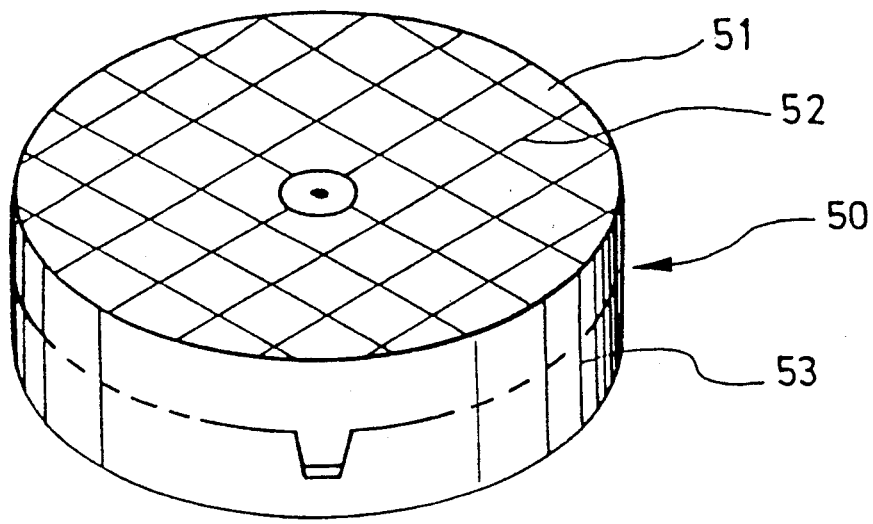
FIG. 12 is a perspective view of a round pallet on a round support.
Figure 13:
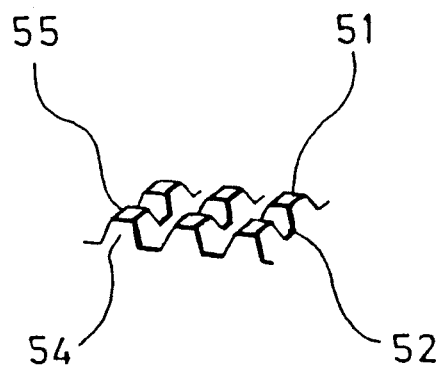
FIG. 13 is a detail of the grooved top surface of the pallet shown in FIG. 12.

As it has already been stated, the method in accordance with the invention is also capable of achieving an especially even and precisely defined contact surface on the pallet. In the embodiment shown in FIG. 12 a pallet 50, which is round in plan, rests on a corresponding support 53 which is also round in plan. The measures for achieving a precise positioning of these two objects 50 and 53 with respect to one another have already been explained in connection with the foregoing embodiments and therefore do not require further description. The explanation that follows relates only to the steps of manufacture taken to achieve a highly precise configuration of a bearing surface insensitive to dirt, of the pallet 50 for an object not shown, such as a workpiece for example.

A pattern 52 of grooves is made in the bearing surface in accordance with the basic shape of the pallet 50 by pressure casting from metal or by sintering the pallet 50 from light metal, brass, a zinc alloy or a sintered material. The production of the groove pattern can be performed simultaneously with the pressure casting or sintering of the pallet, but it may also be performed in a subsequent working step.

By means of the regular groove pattern 52, the upstanding portion of the bearing surface 51 is formed from a number of truncopyramidal units 54. The top surface of the truncopyramidal units forms a plurality of possible surfaces 55 for contact with a workpiece.

In a subsequent manufacturing step the pallet 50 is sized by pressing it with the top surfaces of the truncopyramidal units 54 against a planar sizing tool, causing the pallet 50 to undergo a plastic deformation and sizing in the area of these top surfaces 55.

In this case too, a surface treatment can be performed before or after the sizing operation, by surface coating with a hard material, as for example by nickel plating.

Figure 14:
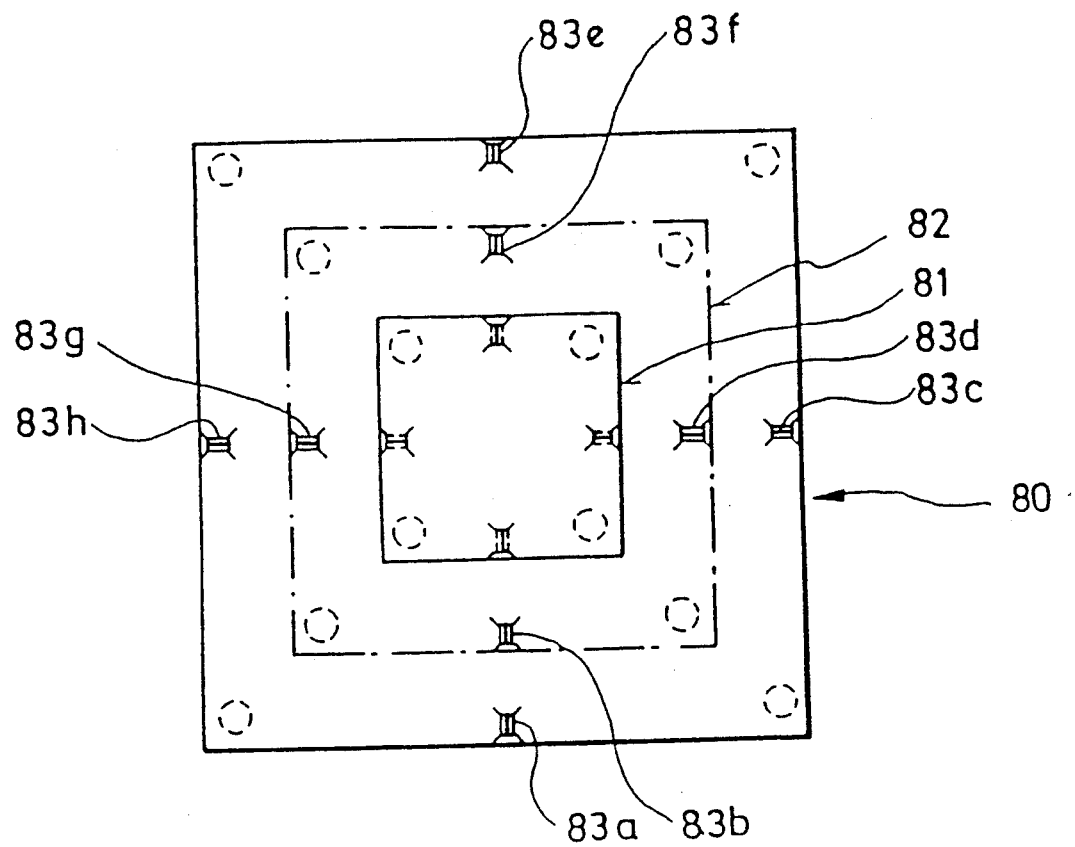
FIG. 14 is a top view of a support with pallet.

FIG. 14 is a plan view of an additional embodiment of a support 80 for several pallets 81, 82 of different size. This pallet corresponds essentially to a non-rotationally symmetrical modification of the embodiment described in conjunction with FIG. 5. The support 80 has, for the accommodation of pallets 81, 82, of different size, a plurality of cradling posts 83a, 83b, 83c, 83d, 83e, 83f, 83g, 83h.

Figure 15:
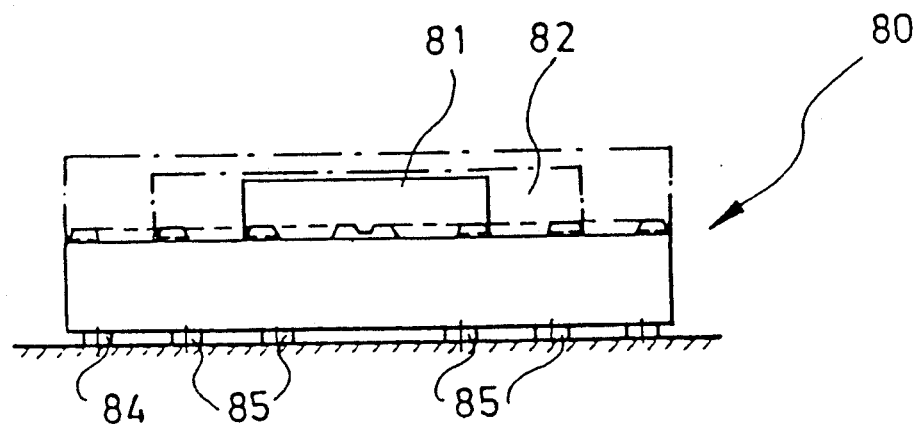
FIG. 15 is a cross section of a detail of the support shown in FIG. 14 with several pallets shown in broken lines.

As it can be seen in the cross section of the support 80 and pallets 82, 83, in accordance with FIG. 15, the support 80 has in addition to combination holding elements and bearings 84, the bearings 85 which do not serve as holding elements and which are intended to prevent the support 80 from sagging under heavy machining.

Figure 16:
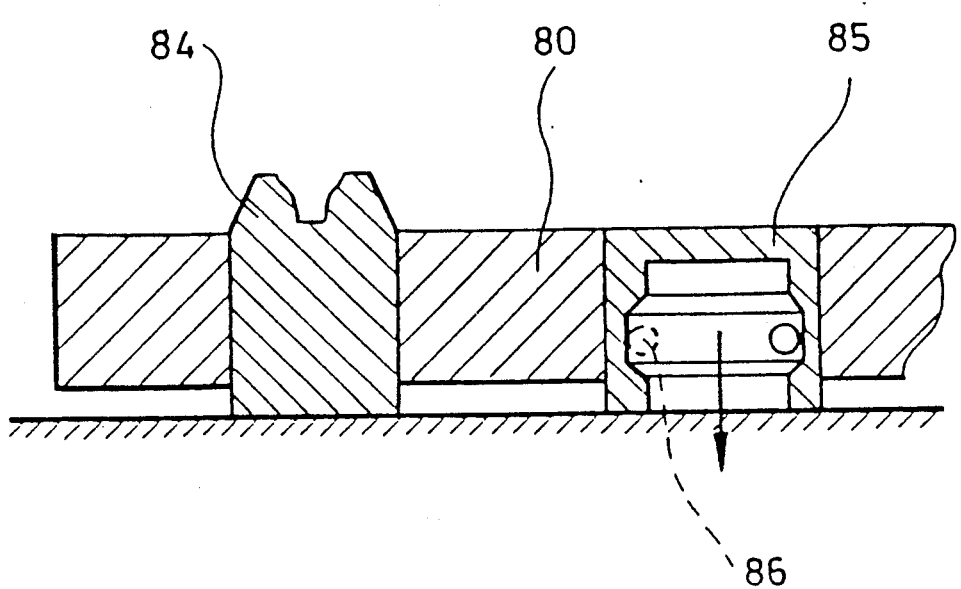
FIG. 16 is a cross section of a detail of a support.

As the cross-sectional detail drawing in FIG. 16 shows, both the posts 85 which are engaged by the holding elements of the machine table and the plain posts 84 which do not bear holding elements are made of a wear-resistant material such as steel, for example, and cast in the aluminum support 80. The holding elements can be formed by ball catches 86 engaging the sloping surfaces of the holding element posts 85.

Figure 17:
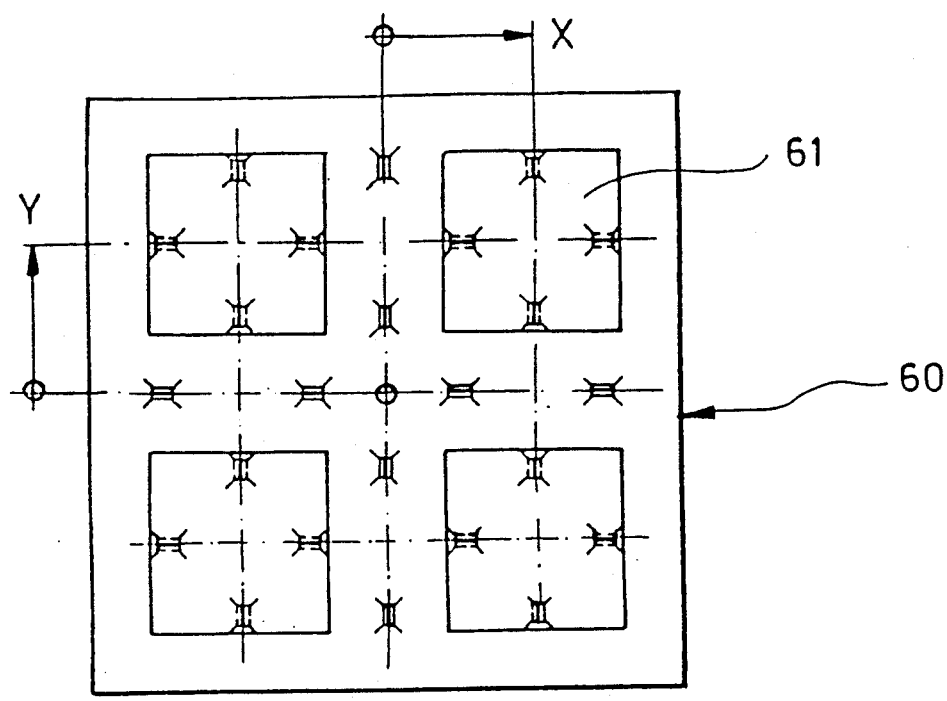
FIG. 17 is a plan view of an additional support with pallets.

FIG. 17 shows a configuration slightly different from the one in FIG. 14, of a support 60 for holding several pallets 61. In this embodiment a high repeatable precision is achieved for the positioning of the pallets 61 with respect to the support 60 in directions x and y.

Figure 18:
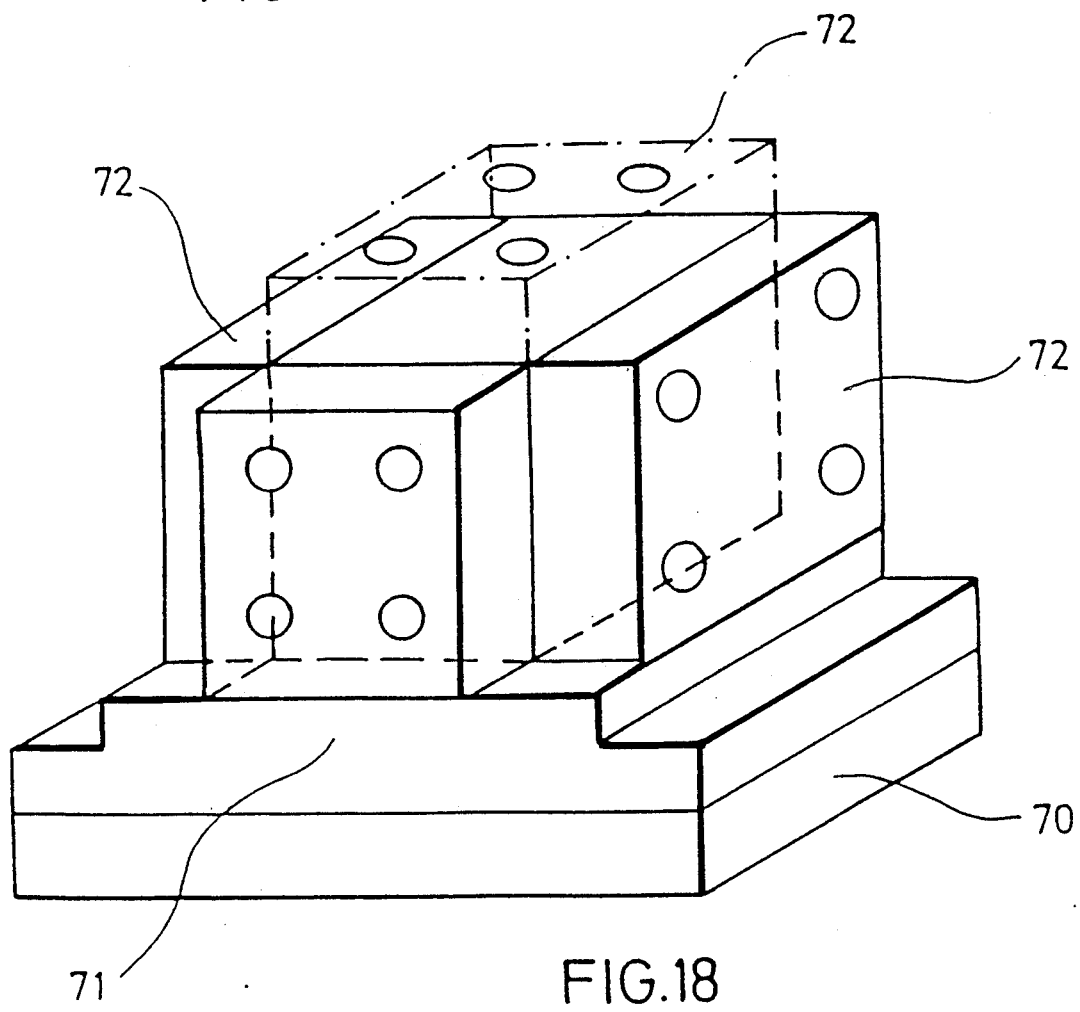
FIG. 18 shows a special embodiment of a support with an intermediate section and a plurality of pallets differently arranged.

FIG. 18 represents a modified configuration of the embodiment shown in FIG. 9. An intermediate holder 71 is affixed to a pallet 70 and is joined to five different supports 72 which permit mounting in five of the six different locations. Otherwise this embodiment is the same as the embodiment in FIG. 9.

Figure 19:
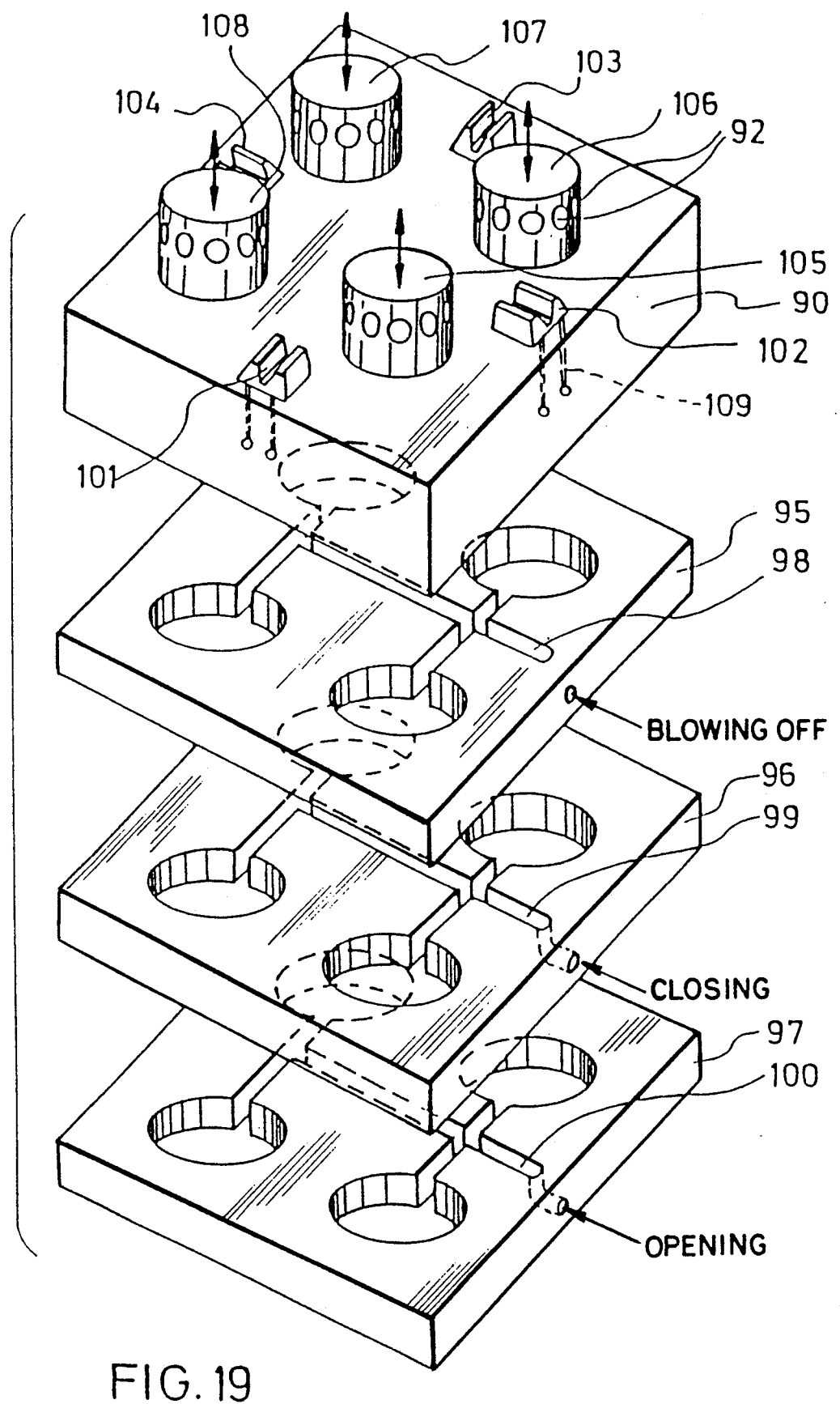
FIG. 19 is an exploded perspective view of a support.

FIG. 19 is an exploded view of a support 90 which is of a sandwich-like configuration provided with four cradling posts 101, 102, 103, 104. On the top of the support are cylindrical posts 105, 106, 107 and 108 which are equipped with ball catches 92 which can be operated hydraulically, pneumatically, mechanically or electromechanically. Passages 109 can carry a cleaning medium, which can be blasting air or a liquid, to the cradling posts 101 to 104. The support 90 has three sandwiched sections 95, 96, 97, in which a system of fluid-carrying passages 98, 99, 100, is disposed. The fluid-carrying system 98 of section 95 carries compressed air to the passages 109 for blowing off the bearing surfaces of the cradling posts 101 to 104. The fluid passage systems 99 and 100 of sections 96 and 97 serve to carry the fluid for closing and opening the catches 92. Due to this sandwiched configuration of the support 90 with the sections 95 to 97 a very simple embodiment of the separate conduit networks 98 to 100 can be implemented.

What is claimed is:

1. A method of manufacturing a pallet including at least one resilient centering tenon having contact surfaces to be engaged in stiff, non-resilient walls of a groove of a machine table for fixing the pallet in a predetermined position relative to the machine table, the method comprising the steps of pressure casting a pallet from a plastically deformable light metal selected from the group consisting of aluminum, aluminum alloy, brass, and zinc alloy to obtain a cast pallet with a centering tenon having contact surfaces, and then pressing at least a centering tenon of said cast pallet obtained in said casting step into a sizing tool which plastically deforms the centering tenon at least on an area of the contact surfaces thereof so that at least said area is sized and solidified.

2. The method of manufacturing a pallet according to claim 1, further comprising a step of providing at least said area with a hard surface coating.

3. The method of manufacturing a pallet according to claim 1, wherein said sizing tool is made of a material harder than said light metal.

4. The method of manufacturing a pallet according to claim 2, wherein said step of providing is performed before said pressing step.

5. The method of manufacturing a pallet according to claim 2, wherein said step of providing is performed after said pressing step.

6. The method of manufacturing a pallet according to claim 2, wherein in said casting step said pallet is cast with an accuracy of about 10 to 50 $\mu m$.

7. The method of manufacturing a pallet according to claim 6, wherein in said pressing step the pallet is sized with an accuracy between 1 to 5 $\mu m$.

8. Method of manufacturing a pallet including a plurality of centering tenons disposed on one plane and offset at uniform angles from one another in the plane and having contact surfaces to be engaged in grooves provided in a support and likewise disposed in the plane and offset at uniform angles from each other, for fixing the pallet in a predetermined position relative to the support, the method comprising the steps of pressure casting a pallet from a plastically deformable light metal selected from the group consisting of aluminum, aluminum alloy, brass, and zinc alloy to obtain a cast pallet with a plurality of centering tenons having contact surfaces; and then pressing at least centering tenons of said cast pallet into a sizing tool which plastically deforms the centering tenons at least in areas of the contact surfaces thereof so that at least said areas are sized and solidified.

* * * * *